Figure 1:
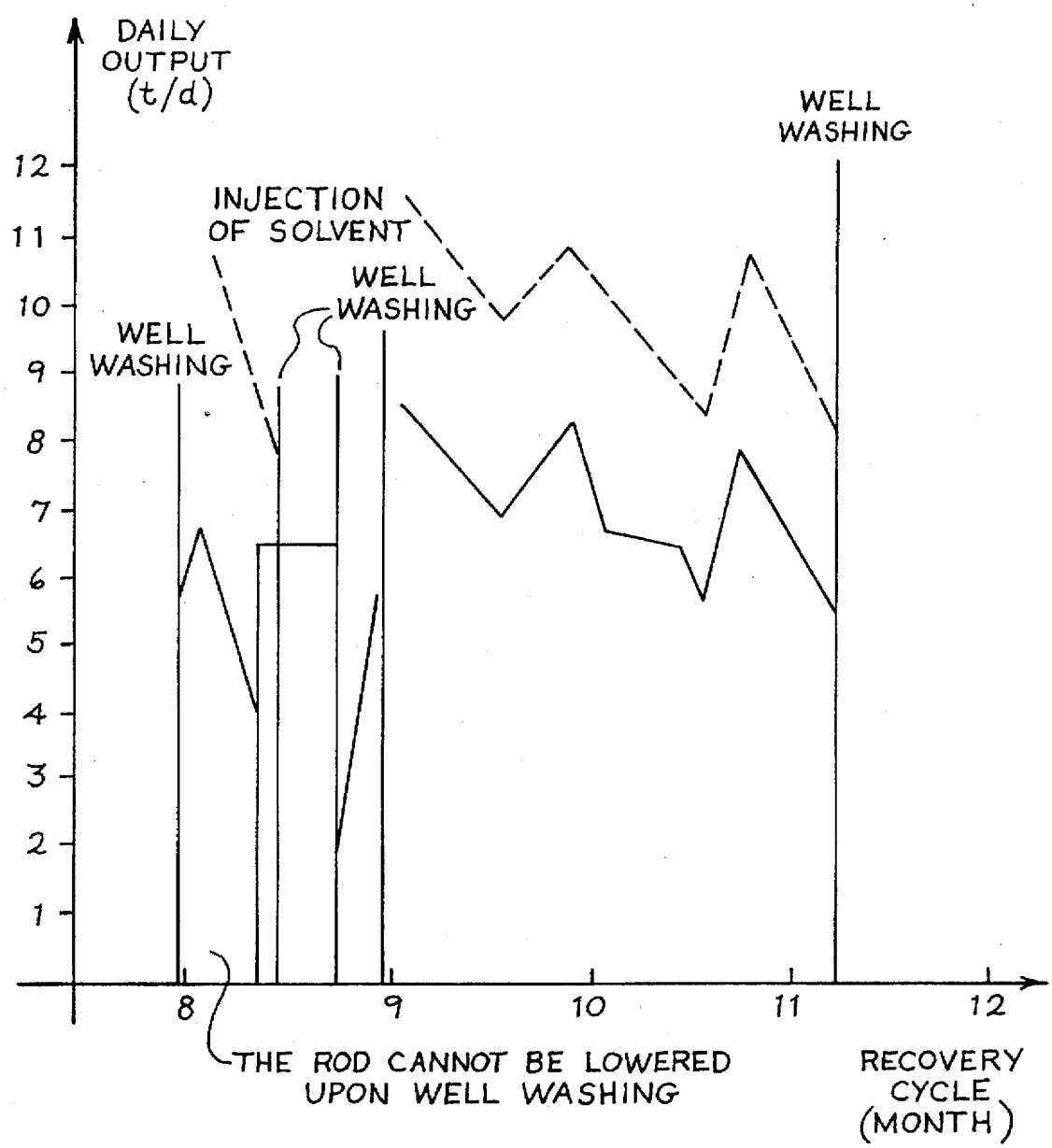

US005686512A

United States Patent [19]
Liu

[11] Patent Number: 5,686,512
[45] Date of Patent: Nov. 11, 1997

[54] PROCESS FOR MANUFACTURING A SURFACTANT FROM PAPER-MAKING BLACK LIQUOR RESIN FOR EXPLOITATION OF PETROLEUM

[76] Inventor: Dongsheng Liu, Xinhe Chemical Laboratory, Hebei Province, China

[21] Appl. No.: 536,927

[22] Filed: Jul. 31, 1995

[51] Int. Cl.[6] .................. C08L 97/02; C07G 1/00; C08K 5/42; C08K 5/01

[52] U.S. Cl. .................. 524/74; 524/72; 524/73; 524/145; 524/157; 524/158; 524/160; 524/481; 524/484; 524/322; 530/502

[58] Field of Search .................. 524/72, 73, 74, 524/145, 157, 158, 160, 481–486, 490, 491, 322; 530/502

[56] References Cited

U.S. PATENT DOCUMENTS

| | | | |
|---|---|---|---|
| 2,221,282 | 11/1940 | Champer | 530/502 |
| 3,865,803 | 2/1975 | Falkehag | 530/502 |
| 3,991,022 | 11/1976 | Dimitri | 524/72 |
| 4,324,747 | 4/1982 | Sudan et al. | 524/72 |
| 4,357,454 | 11/1982 | Holmberg et al. | 524/74 |
| 4,739,040 | 4/1988 | Naae et al. | 530/502 |
| 4,781,251 | 11/1988 | Naae et al. | 530/502 |
| 4,787,454 | 11/1988 | Naae et al. | 252/8.554 |
| 5,027,898 | 7/1991 | Naae | 166/272 |
| 5,035,288 | 7/1991 | Kieke et al. | 166/274 |
| 5,177,169 | 1/1993 | Schroeder | 530/502 |
| 5,230,814 | 7/1993 | Naae et al. | 530/502 |

FOREIGN PATENT DOCUMENTS

| | | | |
|---|---|---|---|
| 0616266 | 3/1961 | Canada | 524/73 |

*Primary Examiner*—Peter A. Szekely
*Attorney, Agent, or Firm*—Brinks Hofer Gilson & Lione

[57] ABSTRACT

The present invention discloses a process for manufacturing surfactants for hydrocarbon by modifying the paper making black liquor resin using modifying agents. The process is to react or combine an alkaline aqueous solution, chemical substances such as olefin, aromatic hydrocarbon, and fatty acids, amino acids, phospholipids as well as one or more of the surfactants for petroleum recovery with 20%–80% of the paper making black liquor resin, the reaction lasting for 1–3 hours at the temperature of 80°–100° C. and ordinary pressure, the pH value of the reaction mixture being kept at 10–12. The surfactant prepared by this method can be effectively used in the recovery of thick oil, asphalt emulsification for road pavement and the oil driving in tertiary recovery oil drainage in petroleum recovery. It has remarkable viscosity reducing effect on petroleum, its emulsification ability being strong, its viscosity reducing rate for $3.0\times10^5$–$5.0\times10^5$ centipoise super thick oil reaching as high as 97%–98%, room oil drainage rate reaching 80.77%, and being able to emulsify 80#–140# petroleum asphalt at low temperature of 40° C.–70° C., the concentration range being used 0.05%–1.5%, it advantageasuly resolves the difficlut problems in the tertiary recovery of petroleum and thick oil recovery. When an investment of RMB ¥ 1800 (Chinese currancy "yuan") is made, a net profit of RMB ¥ 206,800 can be obtained bringing a remarkable economic benefit.

6 Claims, 1 Drawing Sheet

PROCESS FOR MANUFACTURING A SURFACTANT FROM PAPER-MAKING BLACK LIQUOR RESIN FOR EXPLOITATION OF PETROLEUM

The present invention relates to a process of modifying the paper making black liquor resin using a modifying agent to obtain a surfactants for hydrocarbons.

At present, in the petroleum recovery area, after the secondary recovery with water injection, there is still about one third of the petroleum left unrecovered in the gaps of the gravels and rocks under the ground, which can be recovered by chemical processes, this being also the case with thick oil. In the early eighties, many petroleum companies made large investments in chemical extraction for the purpose of obtaining more petroleum, using petroleum sulfonates as a surfactant. However, the price of the petroleum sulfonates is expensive, rendering the cost of extraction too high, so that this method has not been employed extensively. Since the nineties, the big petroleum companies all over the world have been endeavoring to find inexpensive yet highly effective surfactants for petroleum recovery. The newest research achievements discloses that a new method of making a modified lignin has been found, which uses hydrogen, carbon monoxide as reducing agents, adopts a high pressure, high temperature process to prepare a low molecular weight lignin phenol, and combined with oil-based surfactant, finally a product is produced. However, this technique is complicated and costly.

The object of the invention is to provide a process of producing surfactants for hydrocarbons from paper black liquor resin and phenol-lignin resin by modification. The surfactant product of the present invention can be used in thick oil recovery, emulsification of asphalt and oil-driving in tertiary recovery.

To attain the object, according to the present invention, chemical substances as olefins, aromatic hydrocarbons, and fatty acids, amino-acids, phospholipids, as well as one or more of the surfactants for petroleum recovery undergo a chemical reaction or combination in an alkaline aqueous solution with 20%–80% paper making black liquor resin and phenol-lignin resin. The process is as follows, the alkaline aqueous solution is first added into a reactor and the temperature is raised while stirring the mixture simultaneously, to 70° C.~100° C., then the above-mentioned resins are added to the reactor. After the resins are all melted, the modifying agent is slowly added in, and the reaction lasts for 1–3 hours with continuous stirring at temperature 80° C.~100° C. and under atmospheric pressure, the pH value of the reaction mixture being kept at 10–12.

The so-called paper-making black liquor resin is a phenolic-resin-like substance prepared by copolymerization of paper-making black liquor concentrate (content about 50%) and phenols, sulphuric acid at a temperature of 100° C.~105° C. It can be heated together with hexamethylene-tetramine to produce a kind of hard plastic. This technology has been granted a Chinese patent right, the patent number being 881086088. Phenol-lignin resin is a phenolic-resin-like substance made by the reaction of lignin and phenols.

Paper making black liquor is a complicated mixture which is composed of organic substances and inorganic substances. Then organic substances include lignin and the degradation products of hemicellulose, and the inorganic substances include alkali and salt, in the process of reaction with sulphuric acid and phenols, there occurs a series of molecular changes of degradation and combination, in which, the combination reaction between lignin and phenols is well known, where as in the combination reaction between sulphuric acid and lignin, it is determined that in the above-mentioned synthesis of paper making black liquor resin, about 60% of the sulphuric acid has been used in the combination of resins. Therefore, it is thought that sulphuric acid in this reaction functions both as catalyst and as raw material. The reaction equation for the paper making black liquor resin is summarized as

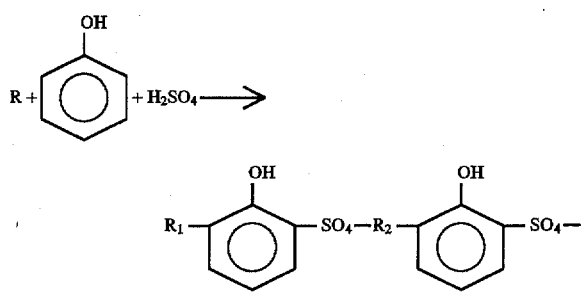

wherein R denotes lignin, $R_1$, $R_2$, denote respectively reduced lignin.

Hydrogen ions in the sulphuric acid molecule reduce lignin to degrade their molecules, and the sulfate ions react with reactive bonds of the organic substances with the result that the paper making black liquor resin is given an oil soluble and wafer soluble property.

The paper making black liquor resin is a chemically active substance. Infrared spectroscopy shows that it has plurality of active groups, such as hydroxyl, carboxyl, ether bond and unsaturated bond.

As compared with the prior arts, the present invention has the following advantages:

1. With the paper making black liquor resin as the basic raw material, the organic substances in the paper making black liquor are being effectively used so that the source of raw material is easily available.
2. The process of production is simple, no conditions of high temperature or high pressure and special chemical apparatus are needed.
3. The uses of this product are extensive. Not only can if be used in the emulsification and viscosity reduction of thick oil, but also in asphalt emulsification for road pavement and oil-driving in tertiary recovery. The temperature needed is low so that large amount of energy resources can be saved.
4. The surfactant of the present invention has remarkable viscosity reduction effect on petroleum, its emulsification ability being strong, its viscosity reducing rate for $3.0 \times 10^5$–$5.0 \times 10^5$ centipoise super thick oil reaching as high as 97%–98%, experimental oil-driving rate reaching 80.77%, the concentration range used being 0.05%–1.5%, and being able to emulsify 80#–140# petroleum asphalt at low temperature of 40° C.–70° C.

The recommended ratio for paper-making black liquor resin and the aforementioned serial modifying agents are as follows:

| | |
|---|---|
| paper making black liquor resin (and phenol-lignin resin) | 30%–80% |
| fatty acids | 20%–30% |
| amino acids | 10%–20% |
| olefin, aromatic hydrocarbon | 5%–20% |
| phospholipids | 10%–30% |

One or more of the above-mentioned serial modifying agents can be selected to react with paper making black liquor resin, or 5–30% of surfactants for petroleum recovery can be added to the above formulation.

FIG. 1 is an oil recovery curve diagram of a conventional oil well.

The surfactant prepared according to the above method and the following formulation can achieve better results when used in oil recovery in a thick oil conventional oil well:

| paper making black liquor resin | 70% |
| fatty acid | 10% |
| surfactants for petroleum recovery | 10% |
| phospholipids | 10% |

The oil bed of that well is rather thin and normal operation is difficult. Previously, oil-based well washing liquor was used to make hot washing, and the result had not been satisfactory. After each washing, the total amount of liquid extracted was 25 cubic meter, and the oil output was 9 tons. After injecting 10 cubic meter of solution prepared by 175 kg of the product of the present invention, the oil output is normal, the "dead well" becomes a high yield well. After 64 days of production, the total amount of liquid extracted was 626.8 cubic meter and the oil output was 360.3 tons costing RMB ¥ 360,000.00. However, 175 kg of the product of the present invention costs only RMB ¥ 2700.00 (Chinese currency "yuan"). Therefore, the economical benefit is remarkable. FIG. 1 shows the oil recovery curve, in which, the solid line denotes oil output curve and the broken line denotes liquid output curve.

What is claimed is:

1. A process for making surfactants for hydrocarbons, comprising the steps of:
   in a reactor containing an alkaline aqueous solution, maintaining a temperature to 70° C.–100° C. while stirring the solution;
   adding to the reactor a resin selected from paper-making black liquor resin, phenol-lignin resin, or a combination thereof;
   melting the resin;
   adding to the reactor at least one modifying agent selected from the group consisting of aromatic hydrocarbons, fatty acids, amino acids, and phospholipids;
   stirring the reactor contents for about 1–3 hours under atmospheric pressure while maintaining a temperature of 80° C.–100° C.; and
   maintaining the pH of the reactor contents between about 10 and about 12.

2. The process according to claim 1, wherein said paper making black liquor resin is prepared from acid catalysis of paper making black liquor concentrate and phenols.

3. The process according to claim 1, wherein the ratio for paper making black liquor resin and the modifying agents is as follows:

| paper making black liquor resin, phenol-lignin resin, or combination thereof | 20%–80% |
| fatty acids | 20%–30% |
| amino acids | 10%–20% |
| phospholipids | 10%–30% |
| aromatic hydrocarbons | 5%–50% | and one or more of the above-mentioned serial modifying agents is selected to add to the reactor with the resin.

4. The process according to claim 1 wherein the ratio of materials added to the reactor comprises: resin—70 wt %; fatty acid—10 wt %; and phospholipids—10 wt %.

5. The method for recovery of petroleum from an oil well comprising injecting the surfactant made according to the process of claim 1 down an oil well and extracting petroleum from the well.

6. The method of making a road surface comprising mixing the surfactant made according to the process of claim 1 with asphalt to emulsify said asphalt and paving a road with the asphalt mixture.

* * * * *